US009400891B2

(12) United States Patent
Stephens (10) Patent No.: US 9,400,891 B2
(45) Date of Patent: Jul. 26, 2016

(54) OWNER CONTROLLED TRANSMITTED FILE PROTECTION AND ACCESS CONTROL SYSTEM AND METHOD

(76) Inventor: Randall Stephens, Loma Linda, CA (US)

(*) Notice: Subject to any disclaimer, the term of this patent is extended or adjusted under 35 U.S.C. 154(b) by 55 days.

(21) Appl. No.: 13/044,462

(22) Filed: Mar. 9, 2011

(65) Prior Publication Data

US 2011/0162040 A1   Jun. 30, 2011

Related U.S. Application Data (63) Continuation-in-part of application No. 12/693,412, filed on Jan. 25, 2010.

(60) Provisional application No. 61/147,000, filed on Jan. 23, 2009.

(51) Int. Cl.
*G06F 21/00* (2013.01)
*G06F 21/62* (2013.01)

(52) U.S. Cl.
CPC .................. *G06F 21/6209* (2013.01)

(58) Field of Classification Search
None
See application file for complete search history.

(56) References Cited

U.S. PATENT DOCUMENTS

| | | | |
|---|---|---|---|
| 7,191,405 B1* | 3/2007 | Jaramillo ...................... | 715/763 |
| 7,318,236 B2* | 1/2008 | DeMello et al. ............... | 726/26 |
| 7,603,563 B2* | 10/2009 | Ansell et al. .................. | 713/182 |
| 8,434,014 B1* | 4/2013 | Jaramillo ...................... | 715/763 |
| 2003/0079133 A1* | 4/2003 | Breiter et al. ................. | 713/182 |
| 2006/0120520 A1* | 6/2006 | Suzuki et al. .................... | 380/28 |
| 2006/0225138 A1* | 10/2006 | Toyohara et al. ............... | 726/27 |
| 2007/0288385 A1* | 12/2007 | Lester ............................. | 705/57 |
| 2008/0066185 A1* | 3/2008 | Lester et al. .................... | 726/27 |
| 2010/0169667 A1* | 7/2010 | Dewan .......................... | 713/193 |

OTHER PUBLICATIONS

Nair, S.K.; Popescu, B.C.; Chandana Gamage; Crispo, B.; Tanenbaum, A.S.;, "Enabling DRM-preserving digital content redistribution," E-Commerce Technology, 2005. CEC 2005. Seventh IEEE International Conference on , vol., No., pp. 151-158, Jul. 19-22, 2005, URL: http://ieeexplore.ieee.org/stamp/stamp.jsp?tp=&arnumber=15240.*

* cited by examiner

Primary Examiner — Jeffery Williams
(74) Attorney, Agent, or Firm — Dean A Craine (57) ABSTRACT

A system that encrypts a file sent by an owner and embeds it with encrypted policy rules. The policy rules are one or more 'access rules' and 'use rules' that determine how the file is accessed and used. The rules may be changed and may be location, time and date sensitive. The file may be sent to a recipient or stored in a file accessed by the recipient may accessed. The recipient registers with the system and assigned an ID. Using the 'access rule', the owner assigns a particular recipient ID to the file. A reader program generates a request to a management server to access and use the file. The management server reviews the policy rules to determine if they are satisfied. If the rules are satisfied, a digital certificate is sent to the recipient that allows the file to be accessed and used according to the policy rules.

7 Claims, 9 Drawing Sheets

OWNER CONTROLLED TRANSMITTED FILE PROTECTION AND ACCESS CONTROL SYSTEM AND METHOD

This utility patent application is a continuation in part application based on the U.S. utility patent application filed on Jan. 25, 2010 (Ser. No. 12/693,412) based on and claims the filing date of the U.S. Provisional patent application (Ser. No. 61/147,000) filed on Jan. 23, 2009.

COPYRIGHT NOTICE

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to computer file security systems and more particularly, to such systems that enable an owner to protect and control access to a file after the file or permission to access the file has been granted.

2. Description of the Related Art

Today, when the owner of a file or attachment (a file), wants to transmit a confidential copy of the file to a recipient, the file is encrypted with a secret password that must be used by the recipient to open the file. Normally, the password is sent to the recipient before the file is sent so it may be opened immediately by the recipient. Because the recipient can forward the file and the password to anyone without the owner's approval or knowledge, such systems only offer protection with recipients who agree not to transfer the password and file to unauthorized individuals.

Some services, such as Google, (www.google.com) provide a database for document control that allow users to setup an administrator profile and then place documents or files into the database. Administrators or users can assign access rights to allow recipients to access the files in the database and download them as needed. While this type of service may be used to restrict access to a file, once the file is downloaded from the database, the owner of the file can no longer control access to it.

Sometimes the owner wants to control when and where a file is used by the intended recipient and the number of times a file is accessed. Sometimes, the owner may want to control how the file is used (i.e., 'read only', edit, copy, etc.) by the recipient. No satisfactory system and method exists today that enables the owner to control a file sent to a recipient in this manner.

Therefore, what is needed is a system and method to protect and control transmitted files from an owner to a recipient, that allows the owner to control, who, what, when, where and how a transmitted file is opened.

SUMMARY OF THE INVENTION

It is an object of the present invention to provide a system and method that allows an owner of a file to control who, when and how a file is accessed and used after it has been initially sent or accessed by a recipient.

It is another object of the present invention to provide such a system and method that enables the owner to later change who, when, where, and how a file is used after it is sent to the recipient.

It is another object of the present invention to provide such a system and method that controls access to a file by associating identification rules and use rules with the file that must be met.

These and other objects of the invention are met by the owner controlled file protection and control system disclosed herein that includes the creation of a protected file with access and control features. During use, the owner selects a desired file to be protected and either sent directly to a recipient or sent to a folder that can be accessed later by the recipient. A recipient may be an individual, a group of individuals, a particular computer, a group of computers, a domain or a network. In order for the recipient to access or use a protected file, he or she must be a registered recipient on the system. During registration, each recipient is assigned a unique recipient ID generated by the system or submitted by the recipient (i.e. name or email address of the recipient). When a protected file from the owner is made available to the recipient, the recipient then uses a reader program to access or open the protected file. In some instances, the owner may send the protected file directly to the recipient or send him or her a notification that a protected file has been saved and available in a folder on the management server.

When creating the protected file, the file is encrypted and one or more 'access rules' and 'use rules' are assigned to the file. The 'access rules' may allow one or all registered recipients to open or access the file. The 'access rules' may also require the recipient(s) to use a specific password, limit the number of times the protected file is accessed, limit access by the recipient to a specific location, or require using a specific computer, network, or domain to receive or access the file. The 'access rules' may also require the recipient to regularly or occasionally ping another computer, a management server or a network. When multiple accesses to a protected file are permitted, one or more 'access rules' may be automatically changed after each access or at designated intervals.

The 'use rules' are used to control how a protected file is used by the recipient. The 'use rules' may allow 'read only', 'read/write', 'print', 'copy', or 'paste' privileges. The 'use rules' too, may be changed automatically or at designated intervals and/or be time restricted.

The system includes the use of a management server in which an owner database file is created for each owner. Each owner database file includes a recipient folder, a protected file folder and a policy rules folder. When a particular set of 'access rules' and 'use rules' are assigned to a file, they may be grouped together by a single policy ID code. As stated above, when a protected file is created, it may be transferred directly to the recipient or saved in the protected file folder on the management server or on another storage location. In the situation where the protected file is sent directly to the recipient, the file data and the 'access rules' and 'use rules' are encrypted. Alternatively, when the protected file is sent directly to the recipient, (such as an email attachment), the 'access rules' and 'use rules' may be replaced by the policy ID code associated with either one or both rules which are then submitted to the management server.

During use, the recipient uses a reader program that first determines if the recipient is registered on the system. If the recipient is registered, then the reader program creates a request to the management server to access and use the protected file. Using the first embodiment of the system, when the request is received, the recipient's name or ID (i.e. user name or email address) is verified and the 'access rules' associated with the protected file are reviewed. If the recipient ID is verified and all 'access rules' are satisfied, then the 'use rules' associated with the protected file are then reviewed and verified. A digital certificate is then sent from the management server to the reader program that allows the file to be decrypted and used according to the associated rules.

It should be understood that the reader program may be browser with a plug-in application and that the protected file may be a protected text file or an image file. If the protected file is an image file accessed via a webpage or a link associated thereon, the plug-in may automatically contact the management server and transmits a request that contains the image file's ID and the recipient's ID. The management server then determines if the 'access rules' or 'use rules' associated with the protected image file are satisfied. If the 'access rules' and' user rules' are satisfied, then a digital certificate is sent by the management server to the plug-in which then allows the browser to decrypt and open the protected image file on the webpage or link. If the 'access rules' or 'user rules' are not satisfied, then no digital certificate is sent and the image file cannot be opened and displayed. Sometimes, a 'generic' or substitute image file may be on the webpage or associated with the link in place of the protected image file. Even though the protected image file maybe temporarily saved in an encrypted format in recipient's computer cache or in an Internet temporary folder, it cannot be opened and viewed without a digital certificate from the management server.

It is important to note that in the system described herein, the protected file is encrypted but maintains its original format so that it may be opened or viewed only by its native software program. Also, it is important to note that the system is not limited for use with a particular type of file.

It is also important to note that 'access rules' determines the name or ID of the recipient(s) that can open or access the file and that the 'use rules' determine how a file will be used. The various combinations of the 'access rules' and 'use rules' may be assigned to the file. For even greater control, either one or both the 'access rules' and 'use rules' may be location, date or time restricted. For example, the owner may allow individual 'A' to access a protected file only with computer '1' or when attached to domain or network '1' or at selected days or time.

It is also important to note that the digital certificate sent from the management server may also have an expiration date or an access limitation value associated with it that causes the digital certificate to automatically expire on a specific day or at a specific time or expire after a specific number of times the protected file has been accessed. Because every time the recipient attempts to access or open a protected file a request for a digital certificate is submitted, greater control may be provided by restricting the lifespan of the digital certificate. When a digital certificate expires, a new digital certificate must be issued before the protected file may be accessed and used. Because the owner may change the recipient ID associated with the file in the recipient folder and the 'access rules' and 'use rules' associated with the protected file in the policy rules folder only the recipient ID and the access and use rules in effect when the new digital certificate is sent are applied. The ability to selectively change the recipient ID, and the individual 'access rules' and the 'use rules', and combine them in a variety of ways, enables the owner to selectively control access and use of the protected file after it has been sent.

DESCRIPTION OF THE PREFERRED EMBODIMENT(S)

An owner controlled file protection and control system 8 disclosed herein that includes the creation of a policy-based, protected file 12 that has embedded or closely associated access and use control features or 'rules'. When a recipient tries to access, open or use the protected file 12, the access and use 'rules' embedded or associated with the protected file 12 must be satisfied before the protected file 12 can be accessed, opened or used.

Figure 1:
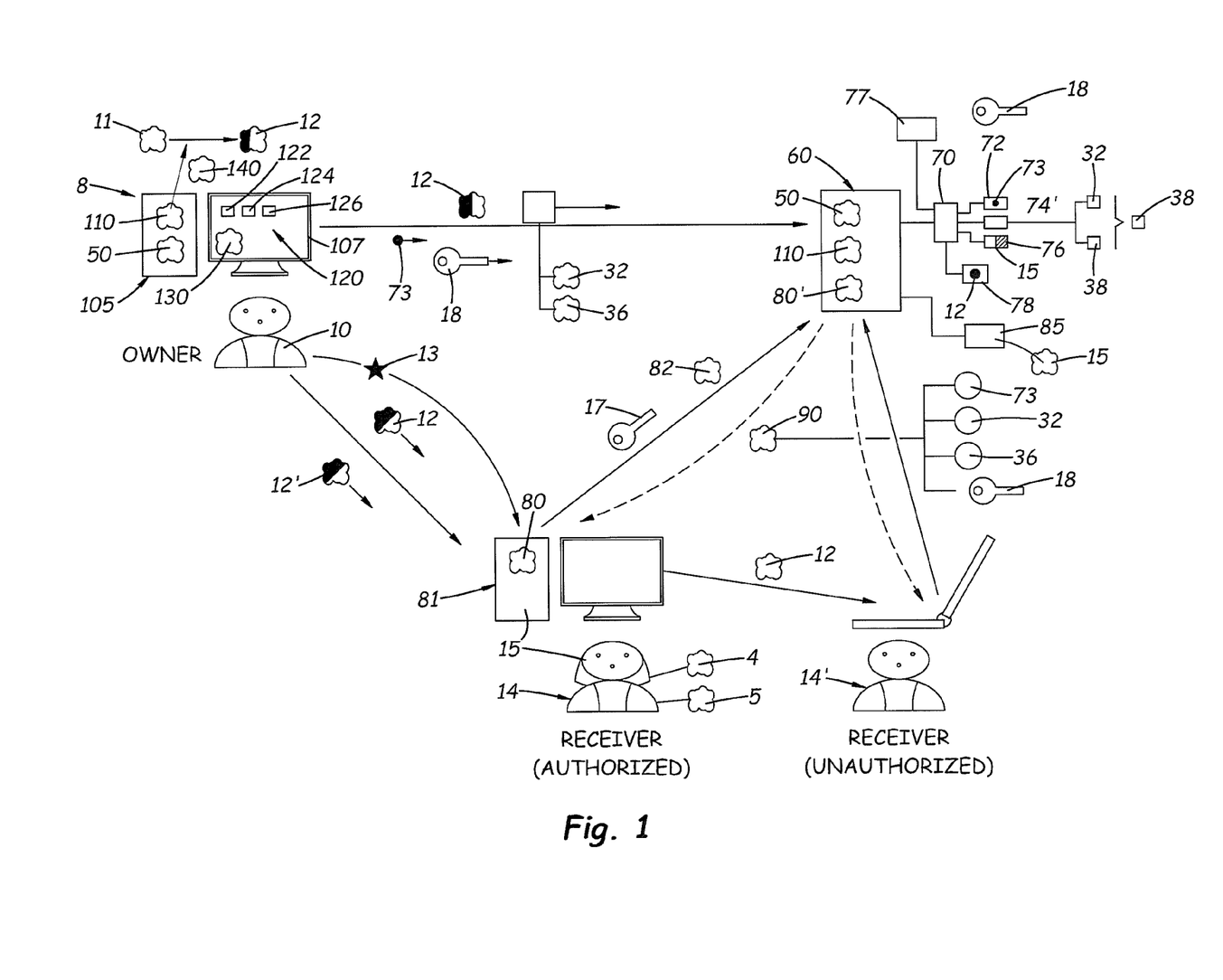
FIG. 1 is an illustration of an owner using a computer to selected at least one protected file, generate a policies that control access and use of the protected files when transmitted to authorized recipients prevent access and use of the protected files by authorized recipients.
Figure 7:
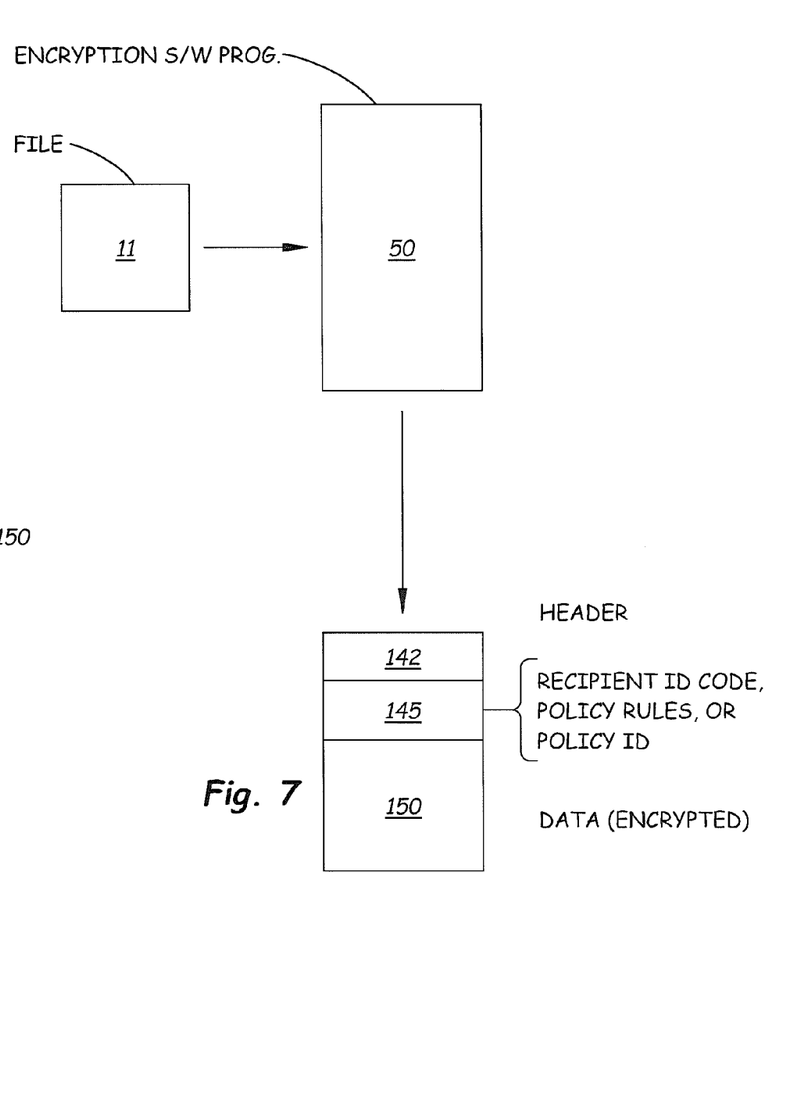
FIG. 7 is an illustration of a file broken into three tiers.
Figure 8:
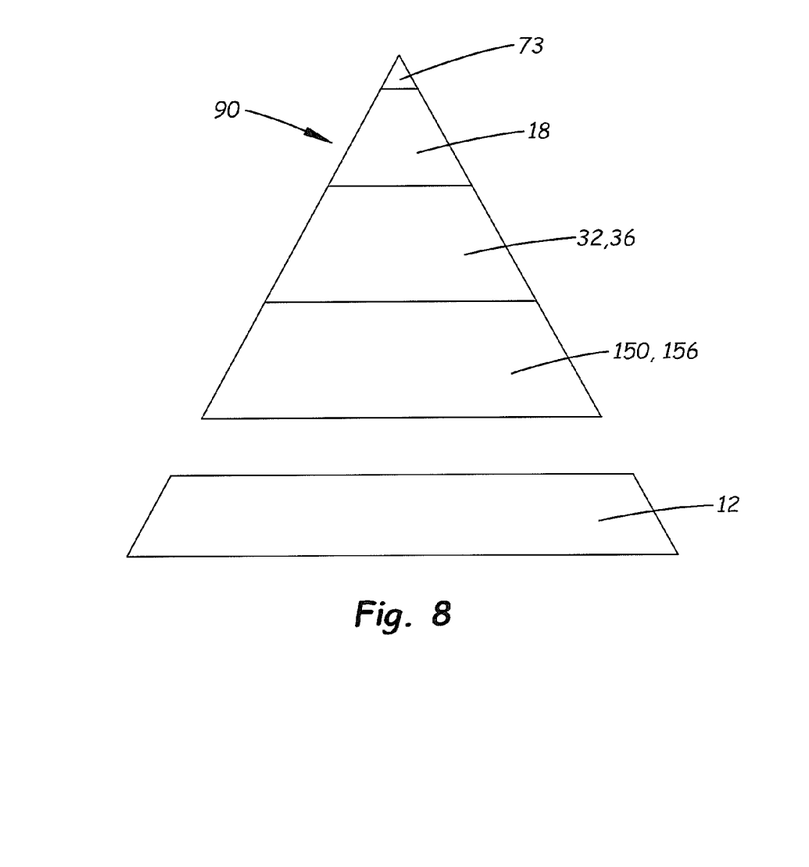
FIG. 8 is an illustration of a digital certificate.

Referring to FIG. 1, a file 11 is designated to be sent or accessed by a recipient 14 is identified by the owner 10. The file 11 is then modified into a protected file 12 by an encryption software program 50 located on the owner's computer 105. As shown in FIG. 7, the protected file 12 is made up of a header 142 that contains general file type information, security data 145 that contains encrypted policy rules 32, 36 or unencrypted policy rule ID 38, and the encrypted file information or data 150. The protected file 12 contains a header 142, security data 145 containing encrypted policy rules 32 and 36 discussed further below, and the encrypted file data 150. In some instances, the protected file contains the header 142, modified security data 145 containing only the policy rule ID 38, and the encrypted file data 150, and indicted by the reference number 12'. An important feature of both protected files 12, 12' is that the underlining format of the file data 150 is not changed so that after decryption, the file's native program may be used to open or access it.

When an owner 10 signs up for the system 8, a copy of the encryption software program 50 is downloaded from the management server 60 into the owner's computer 105. It should be understood however, that in an alternative implement of the system 8, the encryption software program 50 may be kept on the management server 60 and accessed remotely by the owner 10 through a web browser 130. Each owner 10 registered on the system 8 is assigned an owner folder 70 that contains a file ID folder 72, a Policy Rules folder 74, a recipient ID folder 76, and an encryption key folder 77. The owner folder 70 may also contain a protected file folder 78 that contains a copy of the protected file 12.

Also when the owner 10 signs up for the system, a protected file creation software program 110 is also downloaded from the management server 60 into the owner' computer 105. When a file 11 is designated as a protected file 12, the file creation software program 110 is activated which creates a digital registration token 140 that is assigned to it. Once digital registration token 140 has been assigned to a file 11, only the owner 10 change can change the policy rules 32, 36, or the policy ID 38 assigned to the file 11. It should be understood however, that in an alternative implement of the system 8, the file creation software program 110 may also be kept on the management server 60 and accessed remotely by the owner 10 through a web browser 130.

After the digital registration token 140 has been assigned to a file 11, the data in file 11 is encrypted and combined with a header 142 and the encrypted security data 145. During use, the encryption software program 50 creates the encrypted data 150 and then transmits a file ID code 73 to the owners' file ID folder 72. An encryption key 18 used to decrypt the encrypted data 150 is send to the owner's encryption key folder 77. When an 'access rule' 32 is created, a recipient's ID 15 may be designated which is stored in the owner's recipient ID folder 76. All of the 'access rules' 32 and 'use rules' 36 are then delivered to the policy rules folder 74 When stored in the policy rules folder 74, the owner determines whether the security data 145 combined with the encrypted file 11 should be an encrypted copies of the access rules' 32 and 'use rules' 36 or only a copy of the non-encrypted policy rule ID 38.

After the protected file 12 has been created, it may be sent directly to the recipient 14 or stored in protected file subfolder 78 in the owner's database folder 70 on the management server 60. When the protected file 12 is stored in the file subfolder 78, a notification 13 may be sent to the recipient 14 informing him or her that a protected file 12 is now available on the management server 60 for him or her to access and use.

Prior to using the system 8, the recipient 14 must first register with the system 8. During the registration process, each recipient 14 is assigned a unique recipient ID 15 assigned by the management server 60. The recipient ID may also be the recipient's user name or email address. Created on the management server 60 is a recipient folder 85 containing a copy of the recipient ID 15, user name or email address.

In one embodiment of the system 8, when the recipient 14 signs up with the system 8, a reader program 80 is downloaded from the management server 60 and into the recipient's computer 81. In another embodiment of the system, the recipient 14 may be given a system user name 4 and password 5 and allowed to access a reader program 80' located on the management server 60.

When a protected file 12 is sent to the recipient 14 or when the recipient 14 receives a notification 13 that a protected file 12 is saved on the protected file folder 78 on the management server 60 and is available to download, the recipient 14 either activates the local reader program 80 or the management server's reader 80'. An external or internal request 82, respectively, is then created and processed by the management server 60. In the first embodiment, in which the protected file 12 contains a security data 145 made up of the encrypted 'access rules' 32 and 'use rules' 36, the request 82 contains the encrypted recipient ID 15 and file ID. Upon receipt, the management server 60 verifies that the recipient's ID 15 associated with the request 82 matches the recipient ID 15 in the recipient ID folder 76. The management server 60 then reviews the file ID 73 in the file folder 70 and finds the file ID 73 in the file ID folder. If he owner has saved a copy of the protected file 12 on the protected file folder 78, a copy of the protected file 12 is also found in the file folder 78. In the second embodiment where the recipient 14 logs onto the management server 60 and uses the reader program 80' located on the management server 60, the recipient ID 15 may be submitted and verified during the log-on process.

After the management server 60 determines verifies the recipient ID 15 and the file ID 73, the management server 60 then reviews the access and use rules 32 and 36, respectively or the policy ID 38. If the management server 60 determines that the policy rules 32, 36 are satisfied, then a digital certificate 90 is then sent by the management server 60 to the recipient 14. As indicated in FIG. 1, the digital certificate 90 contains the unencrypted file ID 73, the unencrypted access rule 32, the unencrypted use rule 36, and the encryption key 18 used to un-encrypt the protected file 12. As stated above, each time the protected file 12 is accessed or used, an active digital certificate 90 must be found. The digital certificate 90 may be use or time restricted so that it automatically expires after being accessed or used a specific number of times or at a specific date or time. If the digital certificate 90 has expired, a new digital certificate 90 must be issued by the management server 60 before the protected file 12 may be re-accessed or used in the manner listed the policy rules 32, 36. Before a digital certificate 90 is re-issued, the policy rule folder 74 and the recipient ID folder 76 are reviewed. Because the recipient's ID 15 and the specific rules 32, 36 in the policy folders 78 may be changed at any time by the owner 10, and because the digital certificate 90 may be use and time restricted, the owner 10 may selectively control access and use of the protected file 12 after it has been sent or accessed.

Figure 6A:
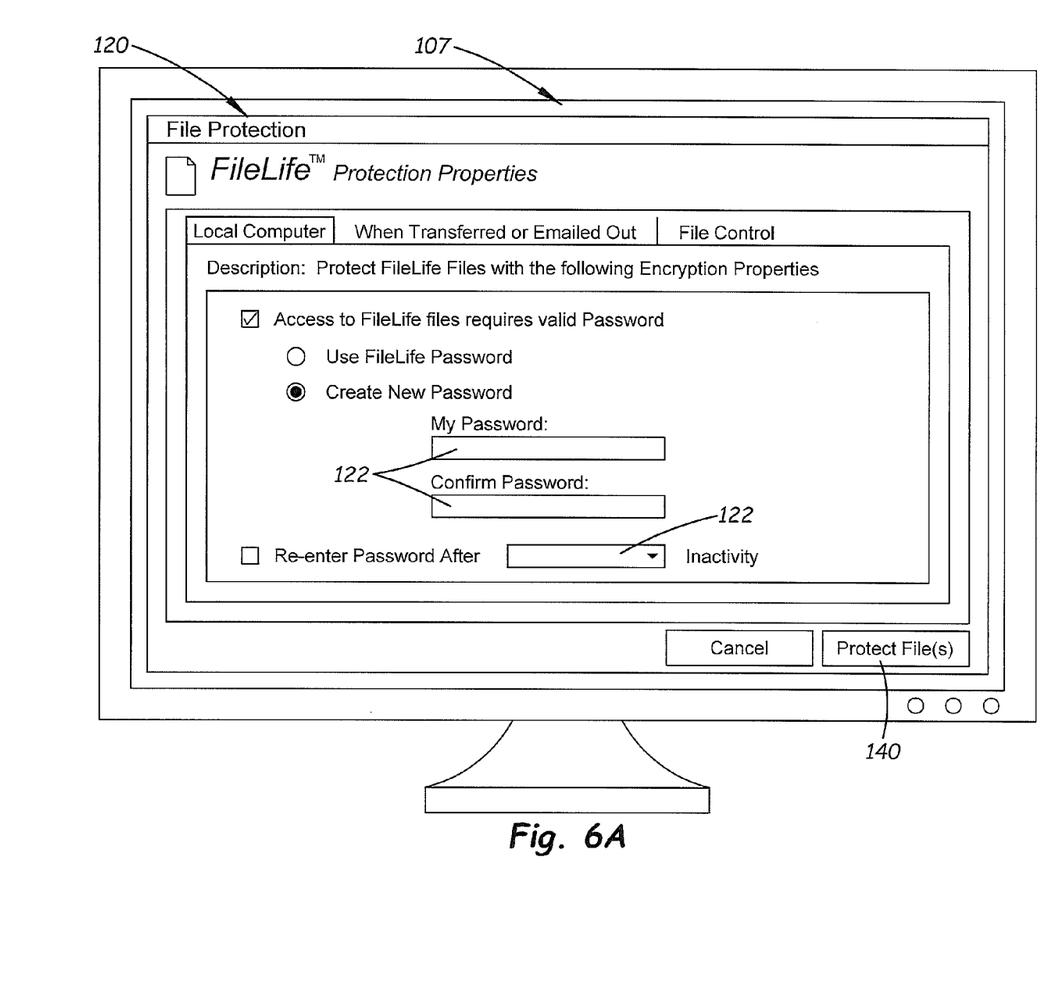
FIGS. 6A-C are sequential illustrations of three policy menu pages which are presented to the owner's display with a plurality of policy rules that are individually selected and become embedded into the protected file.
Figure 6B:
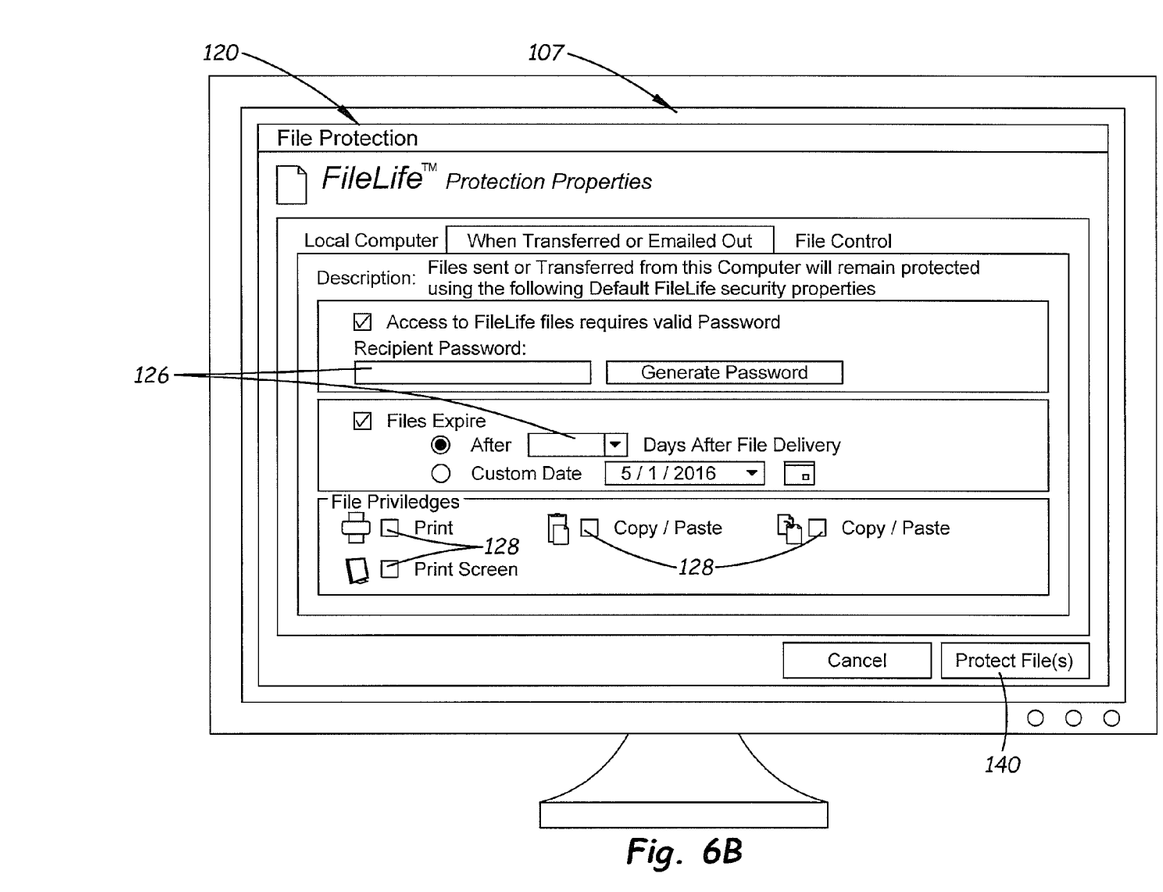
Figure 6C:
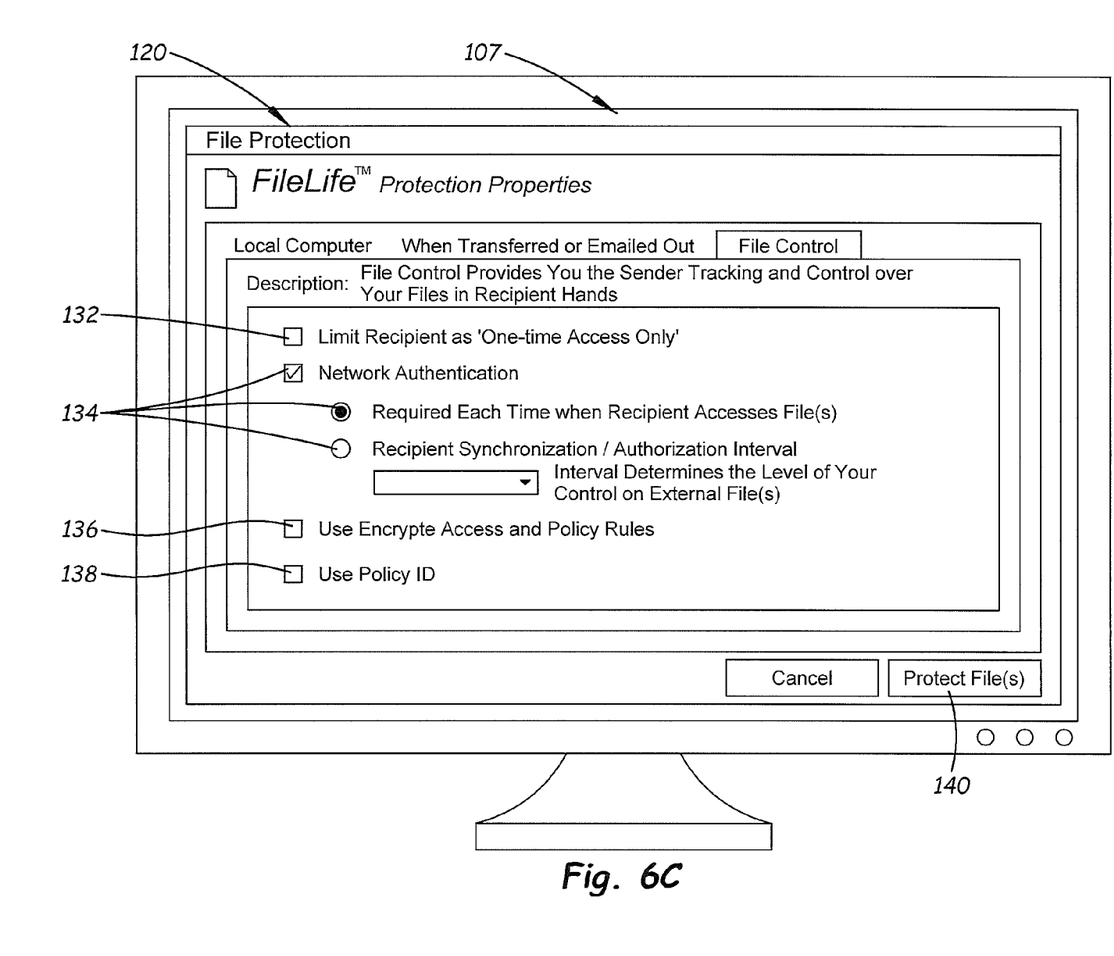

The system 8 includes an owner software program 110 loaded into the working memory of the owner's computer 105 designed to present rule or policy menu pages 120, 124, and 130 on the computer's display 107 that the owner uses to create access and use rules associated with each protected file. FIG. 6A shows a local computer menu page 120 that includes several menu boxes indicated by the reference number 122, which the owner uses to indicate if a password must access a protected file on the management server 60 and what is the required password. FIG. 6B is a second menu page 124 that includes several menu boxes indicated by the reference number 126, that the owner completes to indicate if the recipient must use a specific password to access a protected file. On the second menu page 124, use menu boxes 128 are also provided that enable the owner to designate how the recipient may use the protected file. FIG. 6C shows a third menu page 130 which includes a file control menu boxes 132 that can limit the number of times a recipient may access the protected file, one or more Network Authentication menu boxes 134, a menu box 136 for designating whether encrypted access and use rules be used, and a menu box 138 for designating whether Policy ID should be used. On each menu page 120, 124, 130 is a protected file button 140 that allows the designated menu selections to be assigned to the protected file(s).

The recipient 14 may be an individual, a group of individuals, a computer, a domain, or a network. Sometimes, the recipient 14 may be an individual and a computer and/or a domain or network. If a non-authorized recipient 14' attempts to access the protected file 12, when a request 82 is submitted, the recipient ID's do not match and delivery of the digital certificate 90 is denied. If the digital certificate 90 is originally sent to the recipient 11, and later the owner 10 denies future access or a type of use of the protected file 12, the owner 10 may change the access or use rules associated with the protected file change who, what, when and how the protected file will be used.

To make a file 11 a protected file 12, the file 11 is embedded with information and then encrypted by the encryption software program 50. When the embedding and encryption steps are completed, each protected file 12 is made up of three tiers or levels 142, 145, 150 as shown in FIG. 7. The first tier 142, called the header, contains unencrypted information about the file type, date codes and other properties allowing standard operating systems to determine the required file parameters to function properly. Next, the second tier 145 is created which in the first embodiment, contains the two policy rules 32 and 36. In another embodiment, the second tier is made up only of the policy ID 38 which is normally unencrypted. If the two policy rules 32, 36, are embedded, then a first encryption key 18 is needed to embed the rules 32, 36 into the file 12. If a single policy ID 38 is used, then encryption is not necessary and a second encryption key 110 is generated. The third tier 150 of the protected file 12 includes the original data structure or content of the file 11 and is unencrypted using the encryption key 18 generated by the encryption software program 50.

When accessing a protected file 12 that is embedded with the recipient ID 15 and the two policy rules 32, 36, the recipient 14 is first identified and a digital certificate 90 is then produced. The reader program 80 on the recipient computer 81 then produces the first key 17 which reads the two policy rules 32, 36. Then the policy rules 32 36 are reviewed to determine if they are satisfied. If yes, then the second key 18 located in the digital certificate 90 or is produced by the reader program 80 that allows the recipient 14 to access and use the protected file 12.

In the second embodiment that uses a policy ID 146 embedded into the protected file 12', instead of the policy rules 32, 36, and the register ID 15 has been previous submitted to the management server 60 (i.e., when the recipient logs onto the management server 60 and activates the reader 80'). Under this scenario, only the policy ID 146 from the file 12' is then transmitted to the management server 60. If the recipient ID's match, then the management server 60 creates the digital certificate 90 sent to the reader program 80'. The reader program 80 then produces the second unencryption key 18 to allow the recipient 14 to access or use the protected file 12 in the manner prescribe by the policy rules 32, 36.

When a recipient 14 tries to access or use a protected file 12, it must know what policies are assigned to it. In the first embodiment, the policies 32, 36, are embedded into the protected file 12 and encrypted. In the second embodiment, the policies are identified by a policy rule ID 38 that must be associated with a set of policy rules 32, 36 in policy rules file 74 on the management server 60. In each embodiment, the reader program 80 must be used by the recipient 14 to unencrypt the policy rules 32, 36 or to detect the policy ID 48 (policy ID may be encrypted). If the recipient ID 15 and the conditions of policy rules, 32, 36 or policy ID are met, then a digital certificate 90 containing the encryption key 18 is sent to the reader program 80 authorizing access or use of the file 12. It should be understood that the owner 10 may be an individual, a group of individuals, a domain, or a network. The recipient 14 may be an individual, a group of individuals, a single machine, a group of machines, a domain or a network. Also, the nature of the owner's computer and the recipient's computer is not limited to a desktop or laptop computers but may include any mobile device.

Figure 2:
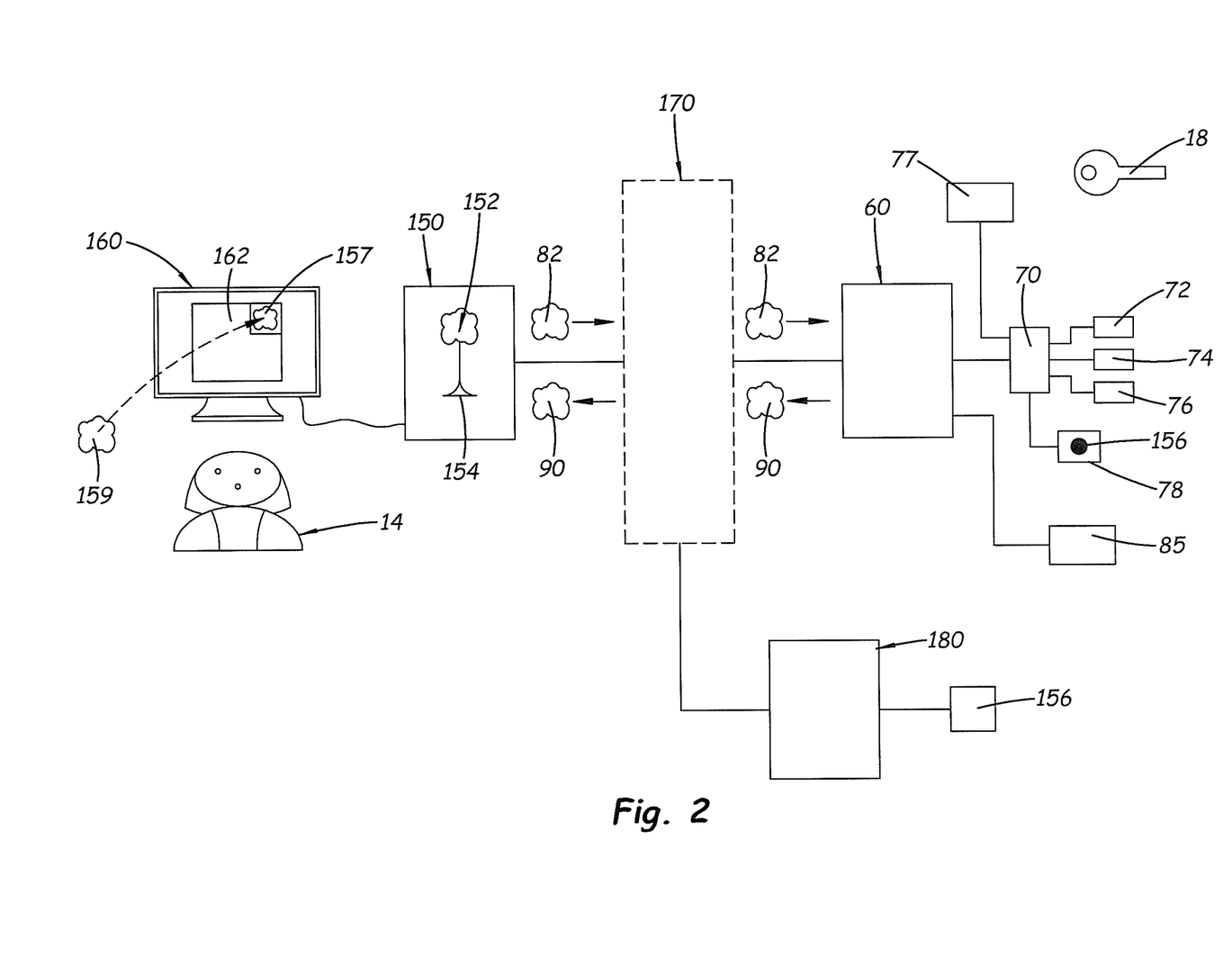
FIG. 2 is an illustration of a recipient operating a computer with a browser with a plug-in reader program and communicates with the management server to view image files
Figure 3:
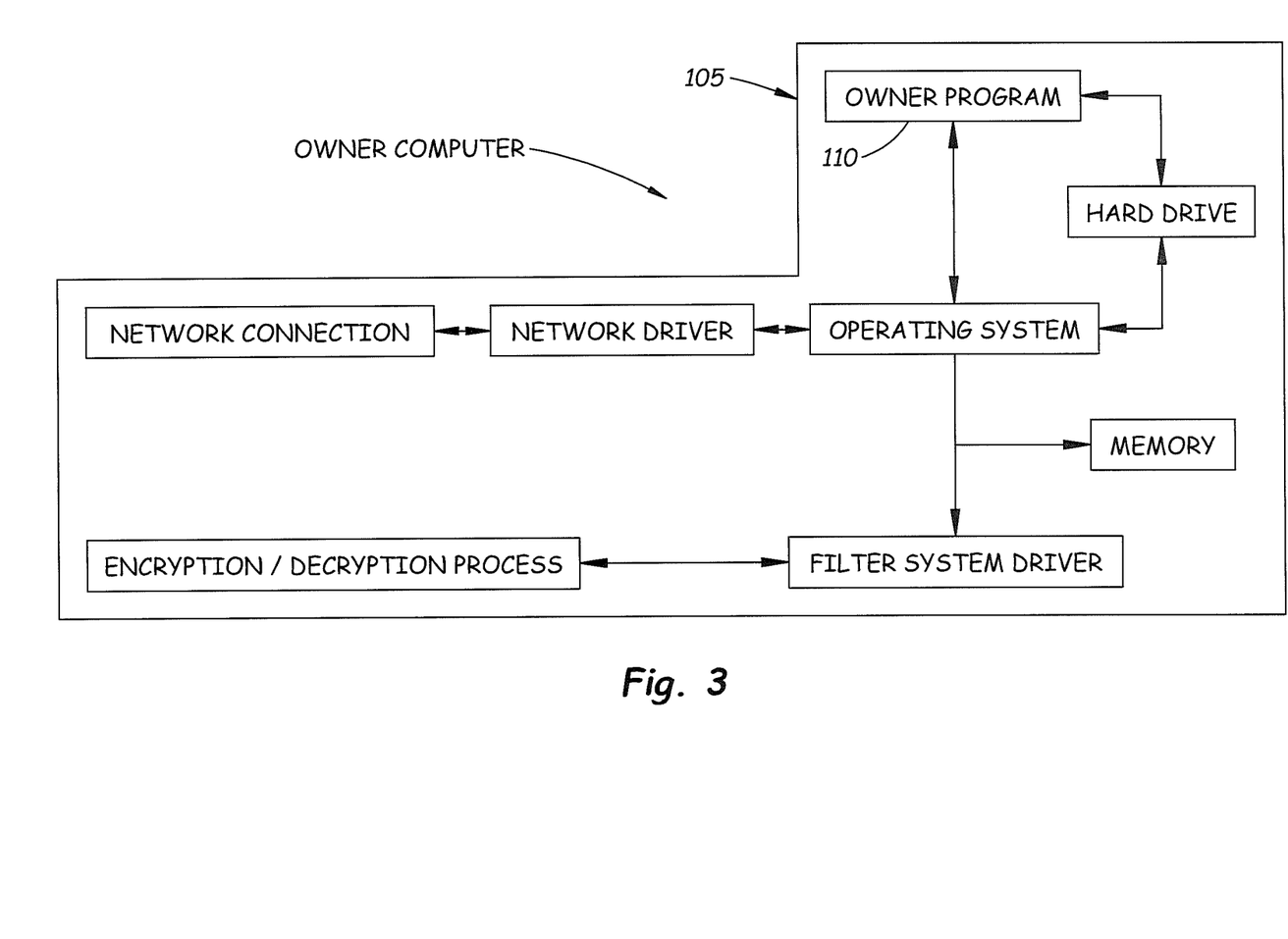
FIG. 3 is a block diagram of the owner's computer.
Figure 4:
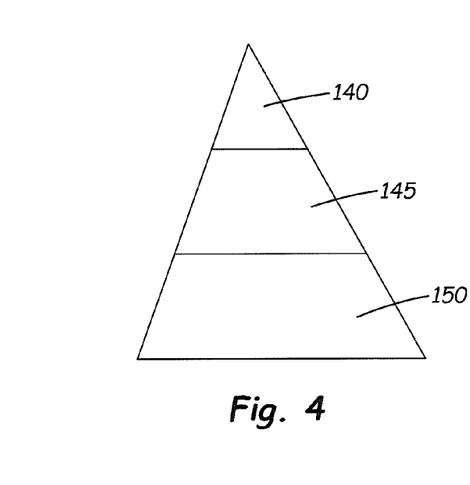
FIG. 4 is an illustration of a protected file made up of a header, security data and encrypted file information data.
Figure 5:
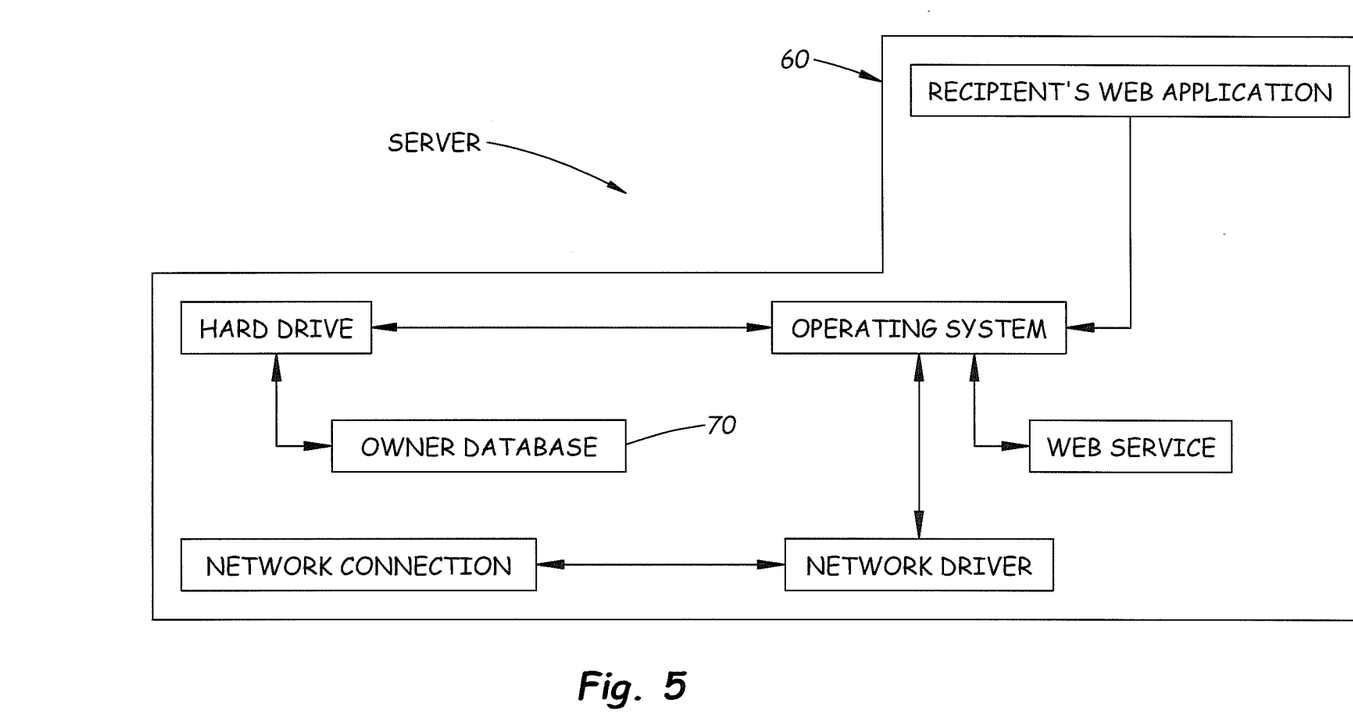
FIG. 5 is a block diagram of the recipient's computer.

FIG. 2 is an illustration of a recipient 14 operating a computer 150 connected to a display 160. The computer 150 is connected to a wide area network 170, such as the World Wide Web, to which the management server 60 is connected. Loaded into the memory of the recipient's computer 150 is a modified browser program 152 that enables the recipient 14 to view web pages 162 delivered to the computer 150 via the wide area network 170. The modified browser program 152 includes a reader program module or a plug-in application 154 that enables it to operate like a standard browser program and as a reader program 80 or 80' discussed above. The modified browser program 152 that operates in a manner similar to the reader programs 80, 80' described above and can communicate with the management server 60 and transmit requests 82 to the management server 60 and to access and use protected image files 156. The modified browser program 152 then opens the protected image file 156 to present the protected images 157 on the webpage 162.

Using the system 8, web pages 162 are created that contain image tags or hyperlinks to the protected image files 156 located on the management server 60 or a host computer 180. In the preferred embodiment, a recipient 14 must be registered on the management server 60 and permitted to download a copy of the modified browser program 152 into his or her computer 150. When the recipient 14 opens a webpage 162 containing an image tag or hyperlink, associated to a protected image file 156, the modified browser program 152 automatically contacts the management server 60 and transmits the request 82 thereto to access or open the protected image file 156. The management server 60 follows a series of verification steps to determine if the recipient ID's and the file ID's match the recipient ID and file ID on the owners folder 76, 78, respectively on the management server 60, and then reviews the policy rules 32, 36 to determine if the rule conditions are satisfied. If the rule conditions are satisfied, then the management server 60 produces a digital certificate 90 which is then transmitted to the modified browser program 152.

The protected image file 156 is encrypted and saved in a folder on the management server 60 or in a folder (not shown) on a website hosting computer 180. The digital certificate 90 contains an encryption key 18 used to un-encrypt the image file 156. It should be understood that the digital certificate 90 may also contain an encrypted copy of the protected image file and encrypted copy of the policy rules 32, 36. The encryption key 18 is used to open and view the encrypted protected image file 156. If the access and user rules are not satisfied, then no digital certificate 90 is generated and sent to the modified browser program 152. In one embodiment, the area on the webpage where the protected image would be shown is blank. In some instances, a 'generic' or substitute image file 159 may be shown on the webpage 162 in place of the protected image 157 It should be understood that in addition to allowing only designated recipients open or view the protected image file, the use rules associated therewith, also control whether the protected image file may be copied, saved, or printed. In the event the protected image file 156 is temporarily saved in the recipient's computer cache or Internet Temporary folder, the system allows the owner to control via a digital certificate 90 whether it can be opened and used in the future.

Using the above described system 8, a method for controlling access and use of a protected file 12 is provide comprising the following steps:

a. selecting a protected file 12 to be transmitted to another individual;

b. creating a set of policy rules 32, 36 the control who and when the protected file 12 may be accessed and how the protected file 12 may be used;

c. associating said protected file 12 with said set of policy rules 32, 36;

d. transmitting said set of policy rules 32, 36 and its association with said protected file to a management server 60, said management server 60 able to send a digital certificate 90 to a recipient 14 only if the set of policy rules 32, 36 associated with said protected file 12 are satisfied;

e. sending the protected file 12 to desired individual, said protected file 12 may be accessed and used only if the recipient 14 receives a digital certificate 90 from said management server 60; and, f. sending a request 80 to said management server 60 requesting a digital certificate 90 that allows said protected file 12 to be accessed and used.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A system for an owner of a protected file to control access or use of the protected file after the protected file has been delivered to a recipient, comprising:
   a. a computer network;
   b. a server connected to said computer network, said server including an owner database file that contains policy rules and a recipient ID, said policy rules containing access rules and use rules associated with said protected file, said recipient ID associated with a recipient authorized to access or use said protected file, said server configured to receive a request to access and use said protected file from said recipient, said server also configured to transmit a time or day restricted digital certificate to a reader program on a remote computer operated by said recipient when said request is received from said remote computer and when said access rules and said use rules associated with said protected file are satisfied said digital certificate includes a header containing information about the file type, and encrypted policy rules or an encrypted policy ID;
   c. an owner computer;
   d. at least one encrypted protected file associated with said policy rules;
   e. an owner software program configured to present a plurality of policy menu pages that enable an owner of said owner computer to identify said unique recipient ID to said authorized recipient, said owner software program also configured to create said policy rules used to determine when and how said protected file will be used or accessed by said authorized recipient and associates said policy rules with said protected file;
   f. a remote computer connected to said computer network and controlled by an authorized recipient assigned a unique recipient ID, and,
   g. a reader program configured to send a request containing said recipient's ID to said server when said authorized recipient attempts to access or use said protected file not previously associated with a digital certificate or associated with an expired digital certificate, said reader program also configured to receive said digital certificate and produces a first key that decrypts said policy rules in said digital certificate and determines if said policy rules are satisfied, and if said policy rules are satisfied then produces or obtains from said digital certificate a second key that decrypts said protected file.

2. A method for an owner of a protected file to control access or use of the protected file after the protected file has been sent or made accessible to a recipient, said method comprises the following steps:
   a. selecting an encrypted protected file associated with a digital certificate;
   b. designating a recipient ID of a recipient authorized to use or access said protected file;
   c. creating a set of policy rules that control who, when or how said protected file may be accessed or used by an authorized recipient;
   d. associating said set of policy rules to said protected file, said policy rules include access rules and use rules;
   e. transmitting said recipient ID and said set of policy rules associated with said protected file or a policy ID to a server, said server configured to receive a request to open or access said protected file, said server also configured to transmit a digital certificate when said request is transmitted from an authorized recipient associated with said recipient ID and said access rules and said use rules are satisfied, said digital certificate contains access rules, use rules and un-encrypt data in said protected file;
   f. selecting a remote computer operated or controlled by said recipient, said remote computer includes a reader program configured to send said request to said server to access and use said protected file, said reader program also configured to receive said digital certificate from said server that enables said protected file to be decrypted and used according to said access rules and said use rules associated with said protected files;
   g. sending said request using said reader program to said server requesting access or use of said protected file;
   h. determining if said request includes a recipient name or ID authorized recipient to access or use said protected file and determining if the access rules and use rules associated with protected file are satisfied; and,
   i. sending said digital certificate from said server to said reader program after verifying said recipient name or ID is an authorized recipient and said access rules and said use rules are satisfied, said reader program produces a first key that decrypts said policy rules in said digital certificate and then determines if said policy rules are satisfied and then if said policy rules are satisfied produces or obtains from said digital certificate a second key that decrypts said protected file.

3. The system as recited in claim 1, wherein said digital certificate automatically expires on a specified date or after a specific number of times the protected file has been accessed.

4. The method as recited in claim 2, wherein said digital certificate automatically expires on a specified date or after a specific number of times the protected file has been accessed.

5. The system as recited in claim 1 wherein said owner computer is a desktop computer, a laptop computer or a mobile device.

6. The system as recited in claim 1 wherein said remote computer is a desktop computer, a laptop computer or a mobile device.

7. The system as recited in claim 1, further including a first key in said digital certificate configured to decrypt said policy rules on said digital certificate.

* * * * *